US006816944B2

(12) United States Patent
Peng

(10) Patent No.: US 6,816,944 B2
(45) Date of Patent: Nov. 9, 2004

(54) APPARATUS AND METHODS FOR PROVIDING COORDINATED AND PERSONALIZED APPLICATION AND DATA MANAGEMENT FOR RESOURCE-LIMITED MOBILE DEVICES

(75) Inventor: Luosheng Peng, San Jose, CA (US)

(73) Assignee: InnoPath Software, Alviso, CA (US)

( * ) Notice: Subject to any disclaimer, the term of this patent is extended or adjusted under 35 U.S.C. 154(b) by 458 days.

(21) Appl. No.: 09/776,594

(22) Filed: Feb. 1, 2001

(65) Prior Publication Data

US 2001/0052052 A1 Dec. 13, 2001

Related U.S. Application Data

(60) Provisional application No. 60/179,761, filed on Feb. 1, 2000.

(51) Int. Cl.[7] .................................................. G06F 12/12
(52) U.S. Cl. ..................................................... 711/133
(58) Field of Search ............................... 711/118, 133, 711/134; 717/168, 174, 173

(56) References Cited

U.S. PATENT DOCUMENTS

| 5,491,800 | A | | 2/1996 | Goldsmith et al. | |
|---|---|---|---|---|---|
| 5,613,108 | A | | 3/1997 | Morikawa | |
| 5,632,018 | A | | 5/1997 | Otorii | |
| 5,771,355 | A | | 6/1998 | Kuzma | |
| 5,815,663 | A | | 9/1998 | Uomini | |
| 5,835,727 | A | | 11/1998 | Wong et al. | |
| 5,835,911 | A | | 11/1998 | Nakagawa et al. | |
| 5,887,254 | A | | 3/1999 | Halonen | |
| 5,903,723 | A | | 5/1999 | Beck et al. | |
| 5,926,624 | A | | 7/1999 | Katz et al. | |
| 5,950,205 | A | * | 9/1999 | Aviani, Jr. | ............... 707/103 R |
| 5,999,932 | A | | 12/1999 | Paul | |
| 6,032,227 | A | * | 2/2000 | Shaheen et al. | ............. 711/129 |
| 6,105,063 | A | | 8/2000 | Hayes, Jr. | |
| 6,169,909 | B1 | | 1/2001 | Koshino | |
| 6,170,060 | B1 | | 1/2001 | Mott et al. | |
| 6,199,076 | B1 | | 3/2001 | Logan et al. | |
| 6,272,333 | B1 | * | 8/2001 | Smith | .......................... 455/418 |
| 6,353,661 | B1 | * | 3/2002 | Bailey, III | ............... 379/93.25 |
| 6,401,239 | B1 | * | 6/2002 | Miron | .......................... 707/203 |
| 6,587,877 | B1 | * | 7/2003 | Douglis et al. | ............. 709/224 |
| 6,607,314 | B1 | * | 8/2003 | McCannon et al. | ............ 400/62 |

OTHER PUBLICATIONS

U.S. patent application Ser. No. 09/776,165, filed Feb. 1, 2001; "Apparatus and Methods For Optimizing Traffic Volume in Wireless Email Communications"; Inventor: Luosheng Peng.

U.S. patent application Ser. No. 09/776,593, filed Feb. 1, 2001; "Apparatus and Methods For Providing Personalized Application Search Results for Wireless Devices Based on User Profiles"; Inventor Luosheng Peng.

U.S. patent application Ser. No. 09/776,598, filed Feb. 1, 2001; "Apparatus and Methods For Providing Data Synchronization by Facilitating Synchronization System Design", Inventor: Luosheng Peng.

* cited by examiner

*Primary Examiner*—Kevin L. Ellis
(74) *Attorney, Agent, or Firm*—Law Office of Roxana H. Yang

(57) ABSTRACT

An exemplary method for managing information in a mobile device comprises the steps of downloading a first set of files, determining whether a local cache has enough space to store the first set of files, storing the first set of files into the local cache if the local cache has enough space, selecting an out-dated record and removing a second set of files corresponding to the out-dated record from the local cache if the local cache does not have enough space, and repeating the determining step until the first set of files is stored into the local cache.

16 Claims, 21 Drawing Sheets

220

| Apps / Parameter | App #1 | App #2 | App #3 | ... |
|---|---|---|---|---|
| Name | "http//www.doongo.com/app/cgi/appserv?appname = prokyman" | "http//www.doongo.com/app/cgi/appserv?appname = musicplayer" | "http//www.doongo.com/app/cgi/appserv?appname = emailprg" | ... |
| nExec | 17 | 3 | 7 | ... |
| lastExec Time | Fri, 25 Feb '00 9:08:11 | Thu, 24 Feb '00 22:03:01 | Fri, 25 Feb '00 13:12:19 | ... |
| isStored | yes | no | yes | ... |
| ... | ... | ... | ... | ... |

| DS \ Parameter | Data Set #1 | Data Set #2 | Data Set #3 | ... |
|---|---|---|---|---|
| Name | "http//www.doongo.com/app/cgi/appserv?appname = dataset1" | "http//www.doongo.com/app/cgi/appserv?appname = dataset2" | "http//www.doongo.com/app/cgi/appserv?appname = dataset3" | ... |
| nAccs | 15 | 2 | 12 | ... |
| lastAccs Time | Fri, 15 Jan '00 9:18:15 | Thu, 28 Feb '00 11:05:21 | Fri, 04 Feb '00 15:11:22 | ... |
| isStored | no | yes | yes | ... |
| ... | ... | ... | ... | ... |

FIG. 2C

APPARATUS AND METHODS FOR PROVIDING COORDINATED AND PERSONALIZED APPLICATION AND DATA MANAGEMENT FOR RESOURCE-LIMITED MOBILE DEVICES

RELATED APPLICATIONS

This application claims priority to the provisional application entitled "Data Synchronization System Modeling and Optimization for Support of Disconnected Operation and High Data Availability," filed on Feb. 2, 2000, and bearing the serial No. 60/179,761.

This application is also related to applications entitled "Apparatus and Methods for Providing Data Synchronization by Facilitating Data Synchronization System Design," "Apparatus and Methods for Optimizing Traffic Volume of Wireless Email Communications," and "Apparatus and Methods for Providing Personalized Application Search for Wireless Devices Based on User Profiles," bearing Ser. Nos. 09/776,598, 09/776,165, and 09/776,593, respectively. These applications were filed on Feb. 1, 2001, all claimed priority to the above provisional application bearing serial No. 60/179,761.

FIELD OF THE INVENTION

This invention relates to apparatus and methods for providing coordinated and personalized application and data management. In particular, this invention relates to apparatus and methods for providing coordinated and personalized application and data management in mobile devices.

BACKGROUND OF THE INVENTION

Computer devices connected by a network are typically capable of sharing information. In a world wide network, such as the Internet, client computers or devices connected to the network are capable of accessing information stored in virtually any server computers connected to the network. Many modern server computers provide rich media that are accessible across the Internet. Examples of rich media are audio, video, image, software, applications, games, data, and other multimedia information.

Typically, transmission of rich media across the Internet requires a wide bandwidth. Further, the cost and efficiency for a user to retrieve rich media is dependent on the capacity of the user's computer or device. Partly due to size constraints, most existing wireless/mobile devices do not have the capacity to effectively retrieve rich media. In particular, most wireless/mobile devices have very limited memory space for caching and inadequate processing capability for retrieving complex objects.

Generally, wireless/mobile devices include a user interface, such as a micro-browser, pre-installed on a wireless/mobile device and a set of fixed applications and hierarchical menus for Internet access. Using the micro-browser, a user typically browses the Internet via one or more gateways using the fixed menus or by manually entering specific uniform resource locators (URLs). Such fixed menus are not tailored to a user's preferences.

Through the micro-browser, a user typically performs a search for an application or data on a network by entering keywords into an input area. Based on the keywords, a search engine, which typically resides in the gateway, performs a search and returns a set of search results. Often, hundreds or thousands of search results are returned. The user then has a choice to narrow the search by entering more keywords or browse through the entire search results for the application or data he/she is looking for. This latter option is especially problematic in wireless/mobile devices where the output device (e.g., screen) and caching memory are typically small and connection to the network is costly.

Once an application or data set is selected, the mobile device typically has to download the application/data set from a server via one or more gateways in order for the user at the mobile device to actually execute or access the application/data set. Repeated downloading of a frequently selected application/data set is inefficient and time-consuming. Further, the mobile device might not be able to access the application/data set at all if it fails to maintain a connection with the servers via one or more gateways during a downloading process.

Thus, it is desirable to provide apparatus and methods that performs efficient application and data set management both on the mobile device and the gateways. An object of this invention is to provide apparatus and methods for coordinated and personalized application and data management in mobile devices.

SUMMARY OF THE INVENTION

An exemplary method for managing information in a mobile device comprises the steps of downloading a first set of files, determining whether a local cache has enough space to store the set of files, storing the set of files into the local cache if the local cache has enough space, selecting an out-dated record and removing a second set of files corresponding to the out-dated record from the local cache if the local cache does not have enough space, and repeating the determining step until the first set of files is stored into the local cache. In one embodiment, if no space can be obtained from the local cache, a record for the downloaded first set of files is stored in a database even though the first set of files is not stored in the local cache.

In an exemplary embodiment, the selecting step includes the step of selecting an application selection record associated to a least recently executed application or a least frequently executed application based on parameter values in each application selection record. In another exemplary embodiment, the selecting step includes the step of selecting a data access record associated to a least recently accessed data set or a least frequently accessed data set based on parameter values in each data access record.

Another exemplary method for managing information in a mobile device comprises the steps of receiving a set of update files, updating a set of original files in a local cache with the set of update files if the set of update files is smaller than or equal to the size of the set of original files, determining whether the local cache has enough space to store the set of update files if the set of update files is larger than the size of the set of original files, updating the set of original files in the local cache in accordance with the set of update files if the local cache has enough space, selecting an out-dated record and removing a set of files corresponding to the out-dated record from the local cache if the local cache does not have enough space, and repeating the determining step until the set of original files is updated in the local cache. In an exemplary embodiment, the set of update files is a set of update application files or a set of update data set files.

Yet another method for managing information in a mobile device comprises the steps of receiving an update notification to update a set of files stored in a local cache, the update notification including an update version identification, dynamically generating an original version identification for the set of files, comparing the update version identification to the original version identification, marking the set of files as out-dated if the update version identification is different than the original version identification, and automatically updating the set of files prior to processing a loading or execution command. In an exemplary embodiment, the set of files is a set of application files or a set of data set files.

An exemplary method for managing information on a mobile device when the mobile device is disconnected from a gateway during an operation comprises the steps of maintaining an active communication state if the disconnection is short-lived, saving a transaction status in a local cache if the disconnection is long-lived, periodically attempting to reestablish connection, and resuming communication at a point of failure when connection is reestablished.

An exemplary computer program product for managing information in a mobile device comprises logic code for downloading a first set of files, logic code for determining whether a local cache has enough space to store the set of files, logic code for storing the set of files into the local cache if the local cache has enough space, logic code for selecting an out-dated record and removing a second set of files corresponding to the out-dated record from the local cache if the local cache does not have enough space, and logic code for repeating the determining until the first set of files is stored into the local cache. In one embodiment, if no space can be obtained from the local cache, the exemplary computer program product further comprises logic code for creating a record for the downloaded first set of files and storing the record in a database even though the first set of files is not stored in the local cache.

In an exemplary embodiment, the logic code for selecting includes logic code for selecting an application selection record associated to a least recently executed application or a least frequently executed application based on parameter values in each application selection record. In another exemplary embodiment, the logic code for selecting includes logic code for selecting a data access record associated to a least recently accessed data set or a least frequently accessed data set based on parameter values in each data access record.

Another computer program product for managing information in a mobile device comprises logic code for receiving a set of update files, logic code for updating a set of original files in a local cache with the set of update files if the set of update files is smaller than or equal to the size of the set of original files, logic code for determining whether the local cache has enough-space to store the set of update files if the set of update files is larger than the size of the set of original files, logic code for updating the set of original files in the local cache in accordance with the set of update files if the local cache has enough space, logic code for selecting an out-dated record and removing a set of files corresponding to the out-dated record from the local cache if the local caches does not have enough space, and logic code for repeating the determining until the set of original files is updated in the local cache. In an exemplary embodiment, the set of update files is a set of update application files or a set of update data set files.

Yet another computer program product for managing information in a mobile device comprises logic code for receiving an update notification to update a set of files stored in a local cache, the update notification including an update version identification, logic code for dynamically generating an original version identification for the set of files, logic code for comparing the update version identification to the original version identification, logic code for marking the set of files as out-dated if the update version identification is different than the original version identification, and logic code for automatically updating the set of files prior to processing a loading or execution command. In an exemplary embodiment, the set of files is a set of application files or a set of data set files.

An exemplary computer program product for managing information on a mobile device when the mobile device is disconnected from a gateway during an operation comprises logic code for maintaining an active communication state if the disconnection is short-lived, logic code for saving a transaction status in a local cache if the disconnection is long-lived, logic code for periodically attempting to reestablish connection, and logic code for resuming communication at a point of failure when connection is reestablished.

BRIEF DESCRIPTION OF THE DRAWINGS

FIG. 2B schematically illustrates an exemplary application selection table in accordance with an embodiment of the invention.

FIG. 2C schematically illustrates an exemplary data access table in accordance with an embodiment of the invention.

DETAILED DESCRIPTION OF THE INVENTION

Figure 1:
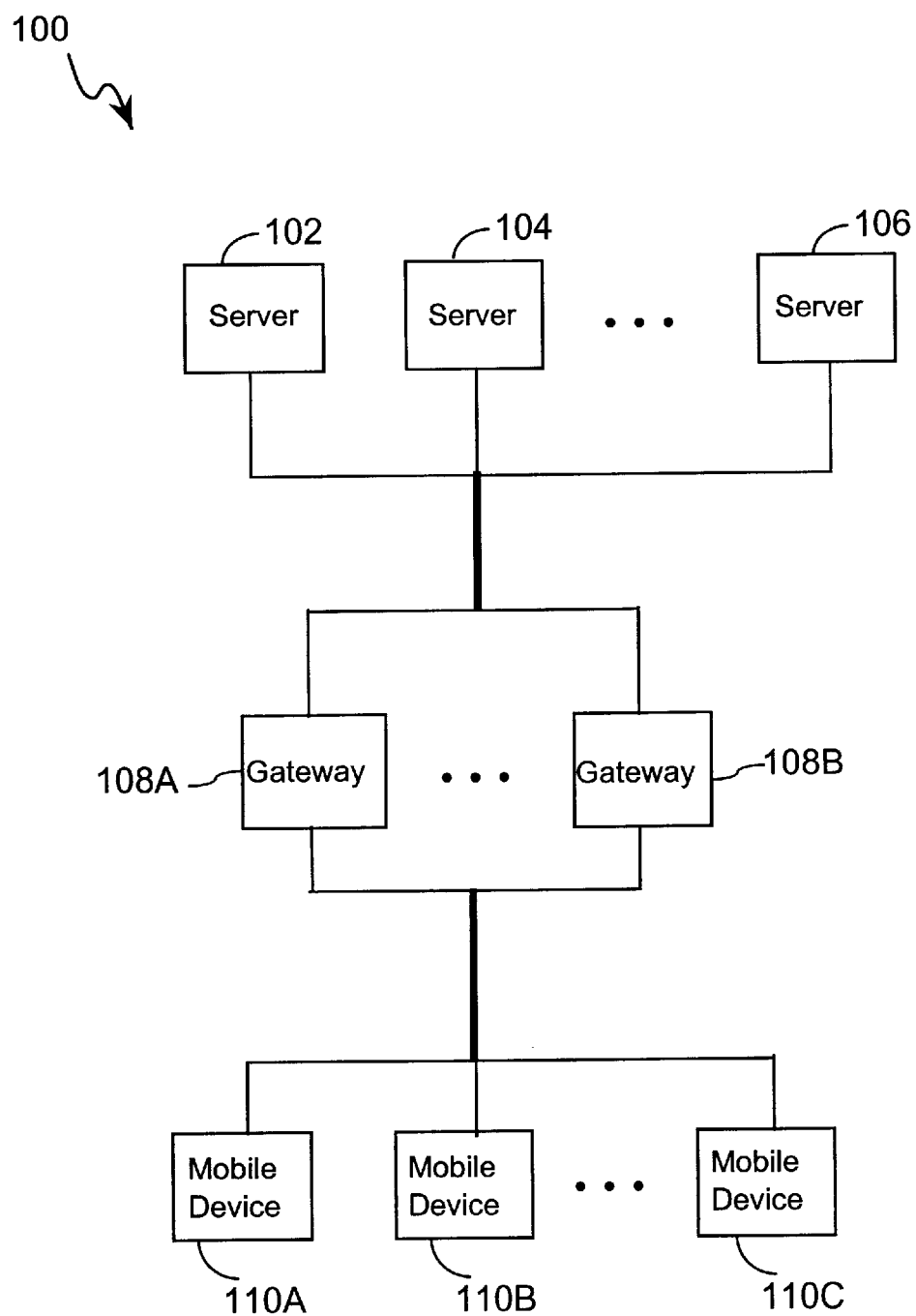
FIG. 1 schematically illustrates an exemplary prior art communications system.

FIG. 1 illustrates an exemplary prior art system 100. The system 100 includes multiple servers connected to multiple gateways that service multiple mobile devices. For ease of explanation, only a representative number of servers, gateways, and mobile devices are shown in FIG. 1. The system 100 includes servers 102–106, gateways 108A–108B, and mobile devices 110A–110C.

Figure 2A:
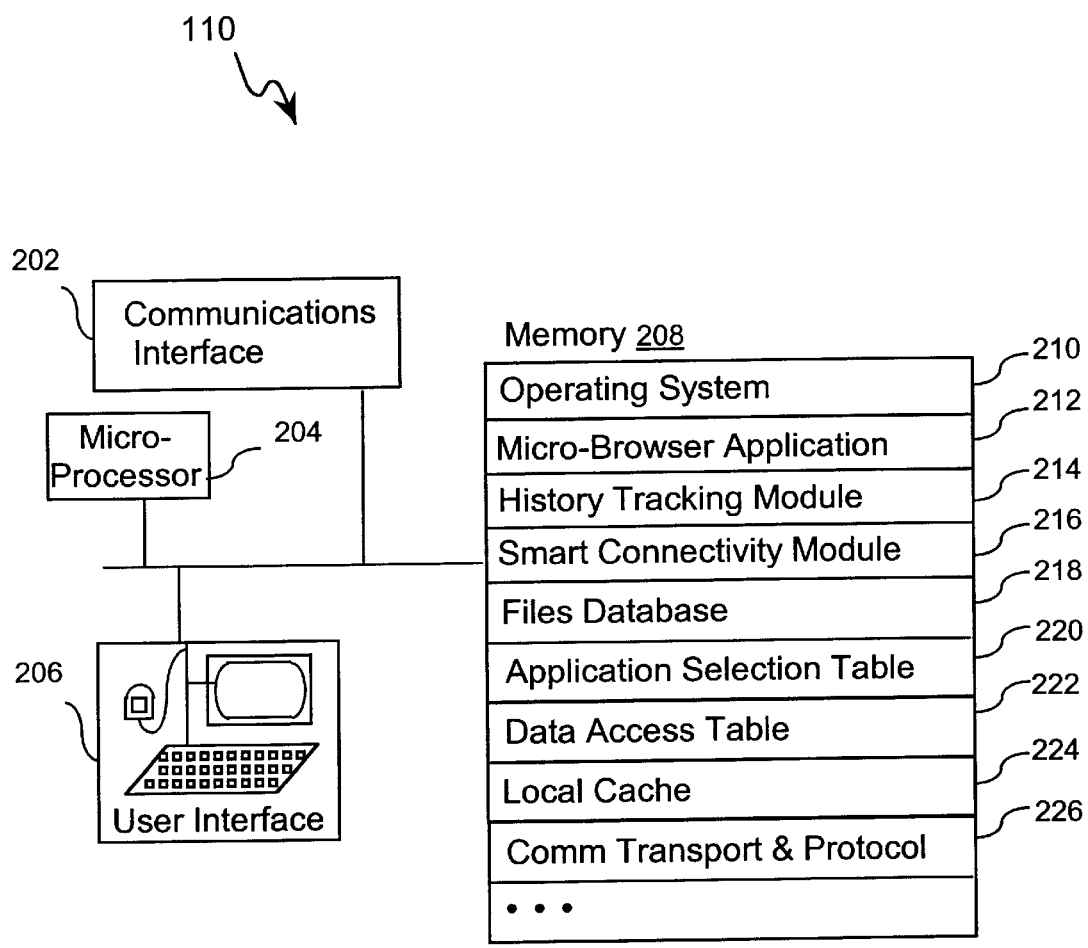
FIG. 2A schematically illustrates an exemplary mobile device in accordance with an embodiment of the invention.

FIG. 2A schematically illustrates an exemplary mobile device 110 in accordance with an embodiment of the invention. The mobile device 110 includes a communications interface 202 for communicating with a network, a microprocessor 204, a user interface, and a memory 208. In an exemplary embodiment, the user interface includes a user input device (e.g., keyboard) and an output device (e.g., screen). The memory 208 includes an operating system 210, a micro-browser application 212, a user operation history tracking module 214 for tracking user operation history, a smart connectivity module 216, a files database 218 for storing downloaded applications and data sets, an application selection table 220, a data access table 222, a local cache 224, and a communications transport protocol module 226 for adapting to different transport protocols in the network.

In an exemplary embodiment, the micro-browser application 212 provides a user interface and may display a list of applications for user selection. The user can select an application in the list of applications displayed. In one embodiment, each item in the list of applications includes a uniform resource locator (URL) and a brief description of the application. For example, the brief description includes a function description, product promotion, or URLs to other related web pages. In an exemplary embodiment, the user can select an application by browsing the list and highlighting the application or by entering an application number. When an application is selected, it is either loaded from the files database 218, downloaded from the gateway 108, or downloaded from an original server of the application. The application selection information is tracked by the user operation history tracking module 214 and recorded in the application selection table 220. Similarly, data access information is tracked by the user operation history tracking module 214 and recorded in the data access table 222. The smart connectivity module 216 defines and maintains the application selection table 220 and the data access table 222.

In an exemplary embodiment, the application selection table 220 includes application selections records that are dynamically updated based on user operation history. In an exemplary embodiment, each application selection record includes various parameters, such as the name of the selected application (name), the number of times that application was executed (nExec), the time of the last execution (lastExecTime), a flag that indicates whether the application is stored in the files database 218 (isStored), the directory in the files database 218 where the application is stored (root), the size of the application (size), the number of files needed to compose the application (nfiles), the array or file names (files), an estimated time of a next version release of the application (nextRelease), the language used to implement the application (language), a flag that indicates whether the application is current (isStale), a flag that indicates whether the application selection record is validated (valid/not valid), and other parameters. An exemplary application selection table 220 is illustrated in FIG. 2B.

In an exemplary embodiment, the number of application selection records in the application selection table 220 is configurable/reconfigurable, depending on device capacity. In one embodiment, an initial set of application selection records are loaded from the gateway 108. This initial set of application selection records in the application selection table 220 is initially set to be not validated because a user has not yet selected an application. As the user begins to download applications and the system begins to track user operation histories, the corresponding application selection records are validated, initialized, and updated.

Similarly, in an exemplary embodiment, the data access table 224 includes data access records that are dynamically updated based on user operation history. In one embodiment, each data access record corresponds to a remote data set which has been recently accessed by the mobile device (e.g., via executed applications). In an exemplary embodiment, each data access record includes various parameters, such as the database or data URL (name), the number of times the data was accessed (nAccs), the time of the last data access (lastAccsTime), a flag that indicates whether the data is stored in the files database 218 (isStored), the directory in the files database 218 where the data is stored (root), the data size in byte (size), the name of an object store that maintains the data set (objStoreName), a flag that indicates whether the data is current (isStale), a flag that indicates whether the data access record is validated (valid/not valid), and other parameters. An exemplary data access table 222 is illustrated in FIG. 2C.

An object store is a container of data set that also manages and updates the data set. In one embodiment, each object store is capable of supporting data synchronization with an original data set in a server. Further, each object store is capable of comparing its data set with the original data set maintained by the server and determining any differences among the two data sets. Storage of data into each object store and data synchronization among object stores are described in more detail in a related application entitled, "Apparatus and Methods for Providing Universal Data Synchronization Algorithms by Facilitating Data Synchronization System Design," filed on Feb. 1, 2001 bearing the Ser. No. 09/776,598. This application is hereby incorporated by reference for all purposes.

Like the application selection table 220, the number of data access records in the data access table 222 is configurable depending on the device capacity. In one embodiment, an initial set of data access records are loaded from the gateway 108. This initial set of data access records in the data access table 222 is initially set to be not validated because a user has not yet accessed any data set. As the applications executed by the user begin to request access to remote data sets, the corresponding data access records are validated, initialized, and updated.

In an exemplary embodiment, bandwidth utilization policies are implemented to allow continuous operations even when the mobile device 110 is disconnected from the gateway 108. For example, for short-lived disconnections, the smart connectivity module 216 remains in an active state and will retry periodically to re-connect with the gateway 108. If a connection is established before a time out, the communication between the mobile device 110 and the gateway 108 will resume at the point of previous failure to minimize bandwidth usage. For long-lived disconnections, the smart connectivity module 216 terminates the current communication transaction and saves the status of the transaction in the local cache 224. When the mobile device 110 is reconnected to the gateway 108, the communication between the mobile device 110 and the gateway 108 will resume at the point of previous failure based on the transaction status saved in the local cache 224. In another exemplary embodiment, if communication fails during an application/data set update transaction, a warning is displayed to the user while the locally stored application/data set will be provided. In an exemplary embodiment, communications between the mobile device 110 and the gateway 108 may be asynchronous if the mobile device 110 is multiple threaded.

Figure 3:
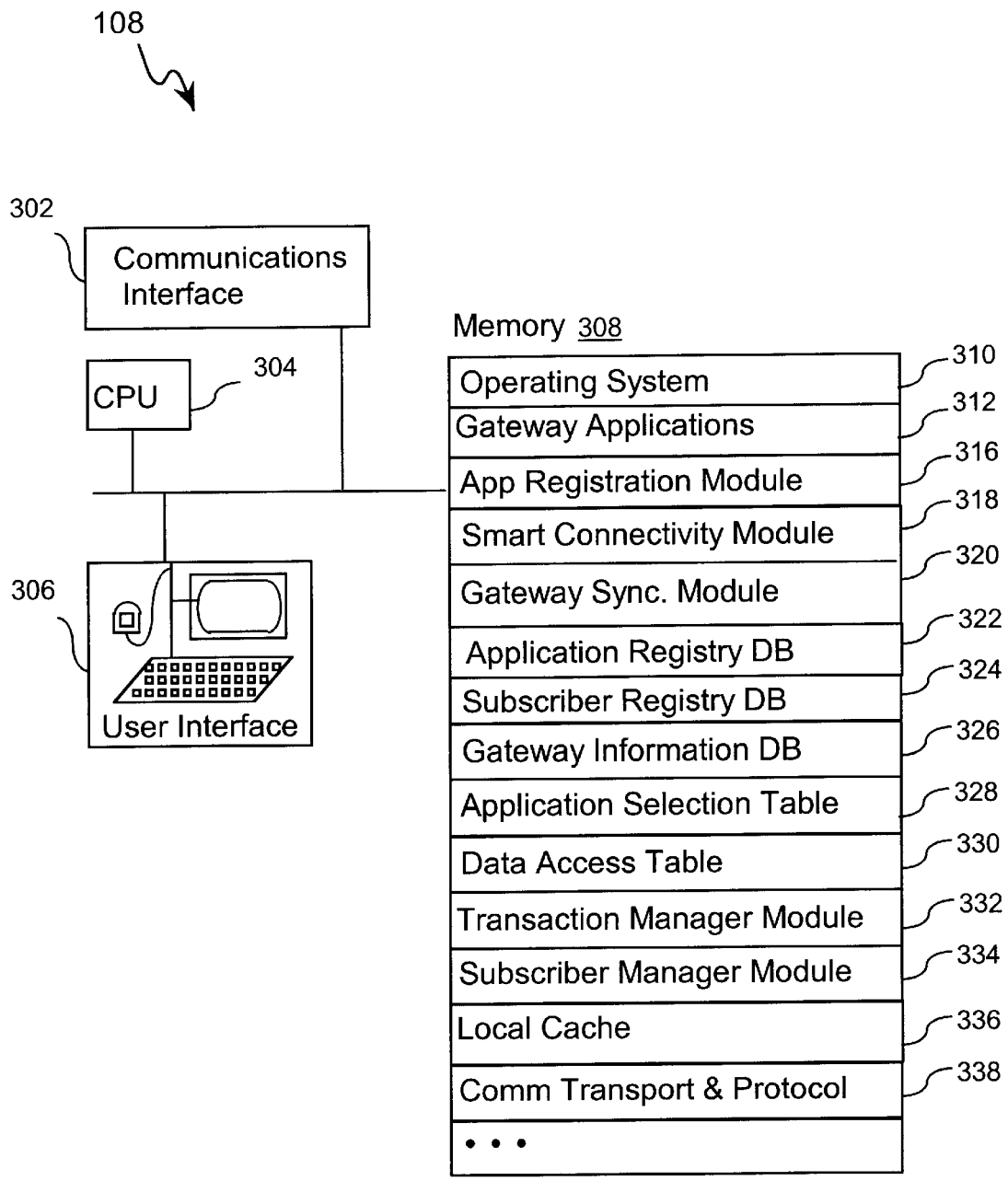
FIG. 3 schematically illustrates an exemplary gateway in accordance with an embodiment of the invention.

FIG. 3 schematically illustrates an exemplary gateway 108 in accordance with an embodiment of the invention. The gateway 108 includes a communications interface 302 for communicating with a network, a CPU 304, a user interface 306, and a memory 308. The memory 308 includes an operating system 310, gateway applications 312, an application registration module 316, a smart connectivity module 318, a gateway synchronization module 320, an application registry database 322, a subscriber registry database 324, a gateway information database 326, an application selection table 328, a data access table 330, a transaction manager module 332, a subscriber manager module 334, a local cache for storing applications and data 336, and a communications transport and protocol module 338. In an exemplary embodiment, the communications transport and protocol module 338 includes transport protocols for communicating with other gateways (e.g., HTTP, file transfer protocol (FTP), simple mail transfer protocol (SMTP), etc.) and with mobile devices (e.g., wireless application protocol (WAP), TCP/IP, HTTP, SMTP, etc.).

The gateway applications 312 include standard gateway applications that are known in the art for performing gateway functions. In an exemplary embodiment, the application registration module 316 collects application registration information from servers or application service providers connected to the network, such as the Internet. In one embodiment, the registration includes an application URL, a brief description of the application, and any assigned keywords for identifying the application. Such registration information is stored in the application registry database 322 via the application registration module 316. Contents in the application registry database 322 in each gateway 108 is synchronized periodically with contents in other gateways. In an exemplary embodiment, such gateway-to-gateway synchronization is triggered and facilitated by the application registration module 316 and the gateway synchronization module 320. The gateway information database 326 includes information about other gateways that is useful for achieving gateway-to-gateway synchronization.

The transaction manager module 332 prevents violations of transaction semantics and data integrity. In one embodiment, the transaction manager module 332 tracks and logs the progress of each transaction, including application download/re-download, application status check, application update, data download/re-download, and data synchronization transactions. Transaction tracking also facilitates billing by providing a detailed record of each user's billable activities. The subscriber manager module 334 facilitates registration of user/subscriber IDs into the subscriber registry database 324. In an exemplary embodiment, user requests to the gateway 108 typically includes the user's subscriber ID. That subscriber ID is checked by the subscriber manager module 324 against the subscriber registry database 324 before requested the services are performed.

The application selection table 328 is a database table maintained on gateways 108. Contents of each application selection table 328 is synchronized with application selection tables in other gateways. Generally, the application selection table 328 contains information similar to the mobile application selection table 220, except the gateway application selection table 328 includes an additional column for the associated subscriber IDs. Further, in an exemplary embodiment, the gateway application selection table 328 maintains selective application information from all users serviced by the gateway 108 and for a longer period of time relative to information stored on mobile devices. The period of maintenance on the gateway application selection table 328 can be an automatic default time or a manually configured time. Similarly, the data access table 330 is a database table maintained on gateways 108. Contents of each data access table 330 is synchronized with data access tables in other gateways. Contents in the data access table 330 are substantially the same as in the mobile data access table 222 except an additional column for the associated subscriber IDs is included.

Figure 4A:
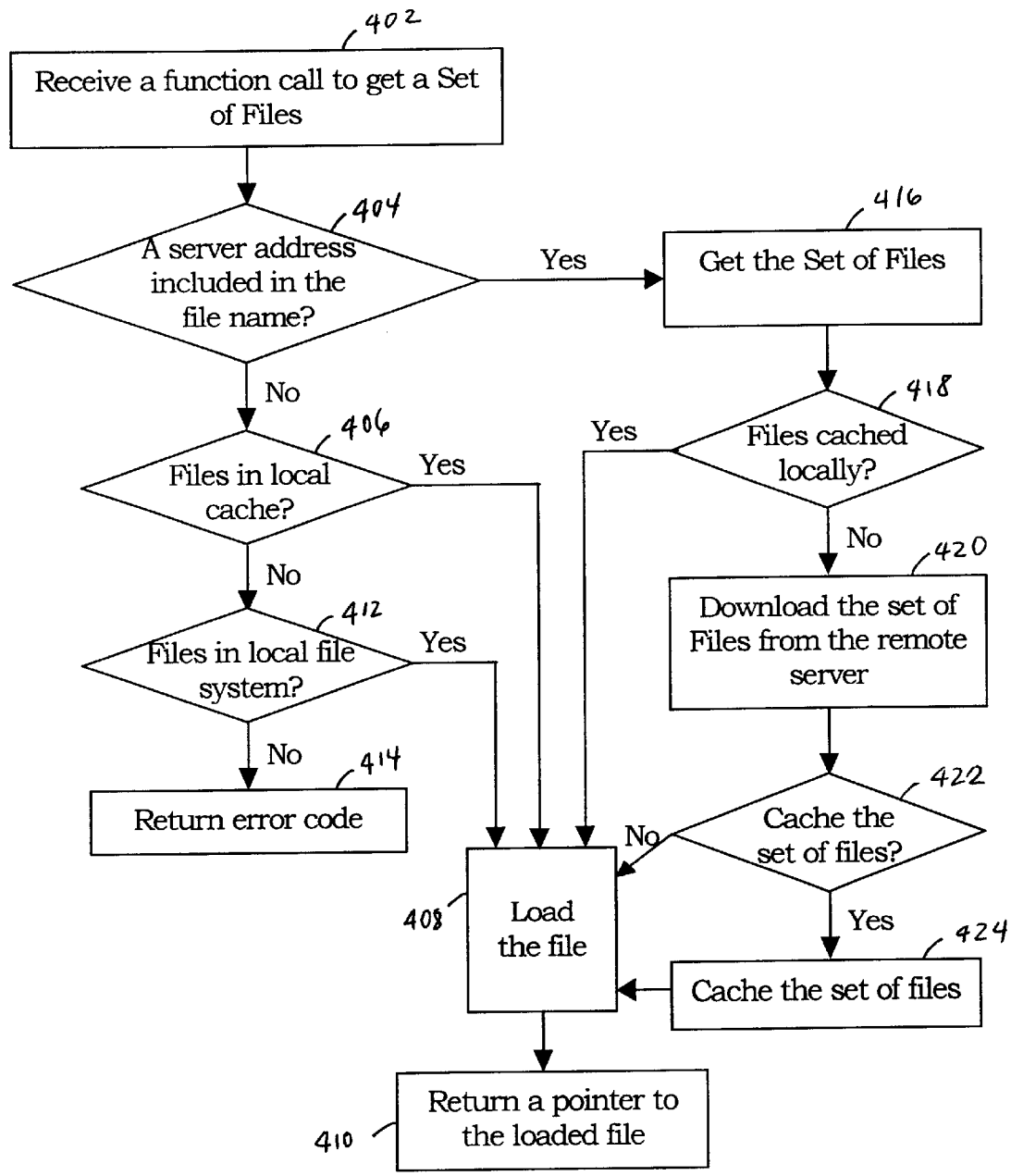
FIG. 4A illustrates exemplary process in accordance with an embodiment of the invention.

FIG. 4A illustrates an exemplary process to load a set of files (such as an application or a data set) in accordance with an embodiment of the invention. At step 402, a user interface application, such as the micro-browser 212 calls a function to get a set of files. The called set of files may be located in the files database 218, the mobile local cache 224, the gateway local cache 336, or at a remote server. In one embodiment, a file URL indicates the path to the set of files. After the called function is received, whether a file name (e.g., an URL) includes a remote server address is determined (step 404). If there is no remote server address, whether the set of files is recorded in the application selection table in the database and cached in the local cache is determined (step 406). If the set of files is cached in the local cache, then the set of files is loaded file-by-file or as needed to the working memory (step 408) and a pointer to a first loaded file is returned (step 410). Referring back to step 406, if the set of files is not located in the local cache, whether it is located in a local file system is determined (step 412). If the set of files is located in the local file system, then the set of files is loaded file-by-file or as needed to the working memory (step 408) and a pointer to a first loaded file is returned (step 410). Otherwise, an error code is returned (step 414).

Referring back to step 404, if a server address is included in a file name, a command to get the set of files is issued (step 416). If the set of files is located in a local cache (step 418), then the set of files is loaded file-by-file or as needed to the working memory (step 408) and a pointer to a first loaded file is returned (step 410). If the set of files is not located in a local cache (step 418), the set of files is downloaded from the server using the server address (step 420). Next, whether to cache the downloaded set of files is determined (step 422). If the set of files is to be cached, the files are cached and the application selection table is appropriately updated (step 424), then the set of files is loaded file-by-file or as needed to the working memory (step 408) and a pointer to a first loaded file is returned (step 410). Referring back to step 422, if the set of file does not need to be cached, the set of files is loaded file-by-file or as needed to the working memory (step 408) and a pointer to a first loaded file is returned (step 410).

Figure 4B:
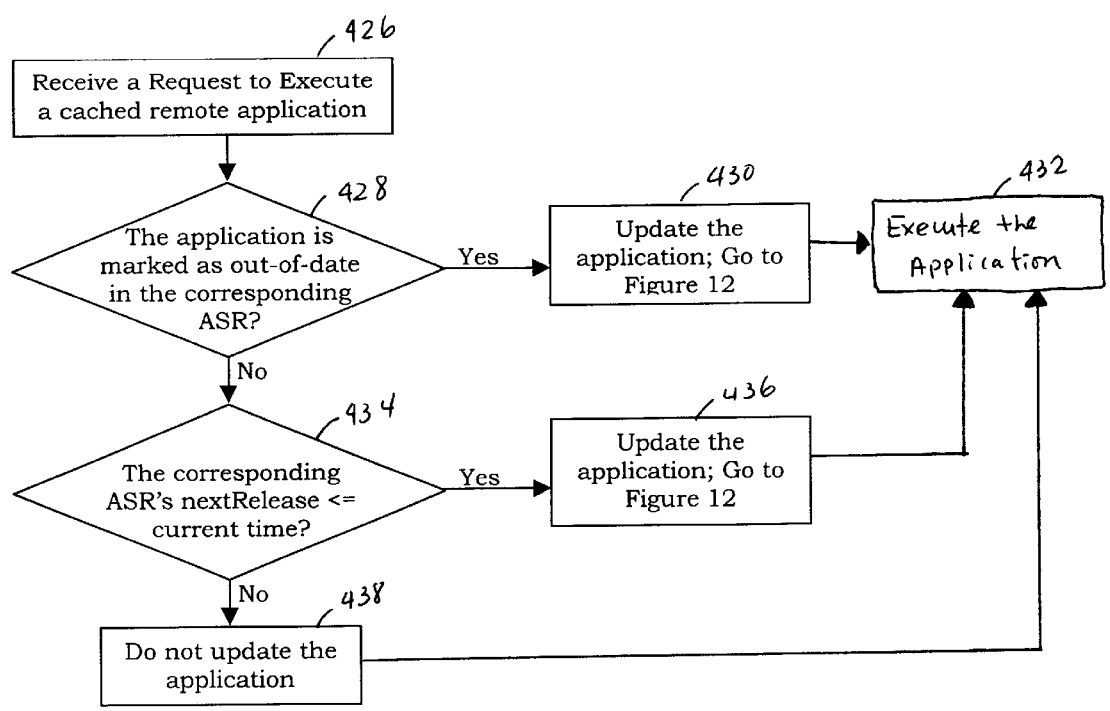
FIG. 4B illustrates other exemplary process in accordance with an embodiment of the invention.

FIG. 4B illustrates an exemplary process for determining whether to update an application in accordance with an embodiment of the invention. At step 426, a request to execute a cached application is received. Whether the application is marked out-of-date in its corresponding application selection record is determined (step 428). If the application selection record is marked out-of-date, the application is updated as described in FIG. 12 below (step 430) and the updated application is executed (step 432). Referring back to step 428, if the application is not marked out-of-date, whether the application's corresponding application selection record's nextRelease parameter is less than or equal to the current time is determined (step 434). If so, the application is updated as described in FIG. 12 below (step 430) and the updated application is executed (step 432). Otherwise, the application is not updated (step 438) and the application is executed (step 432).

Figure 5A:
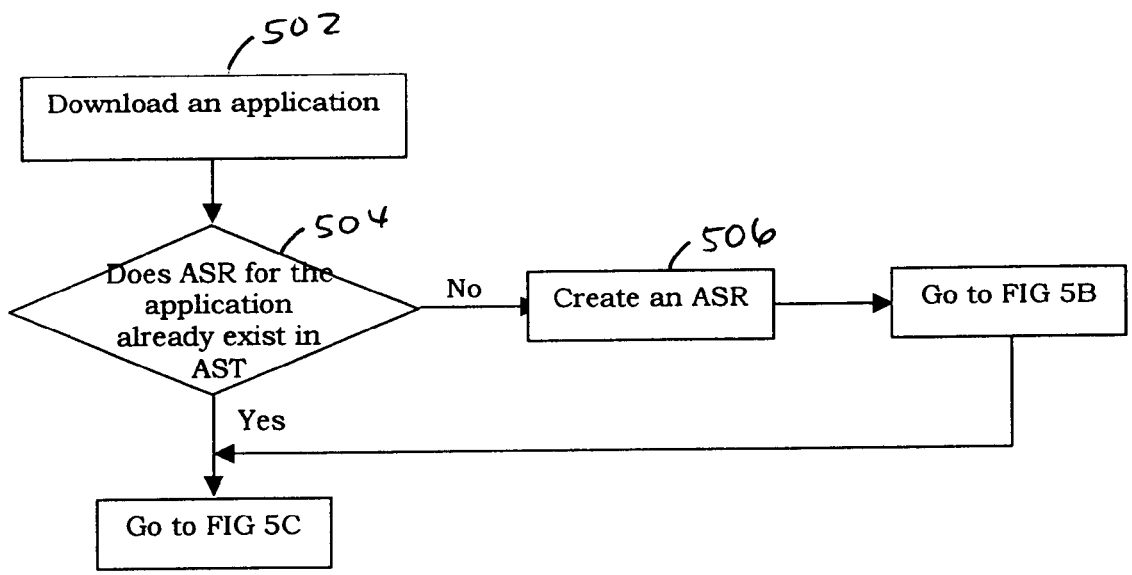
FIGS. 5A–5C illustrate an exemplary application management process in accordance with an embodiment of the invention.
Figure 5B:
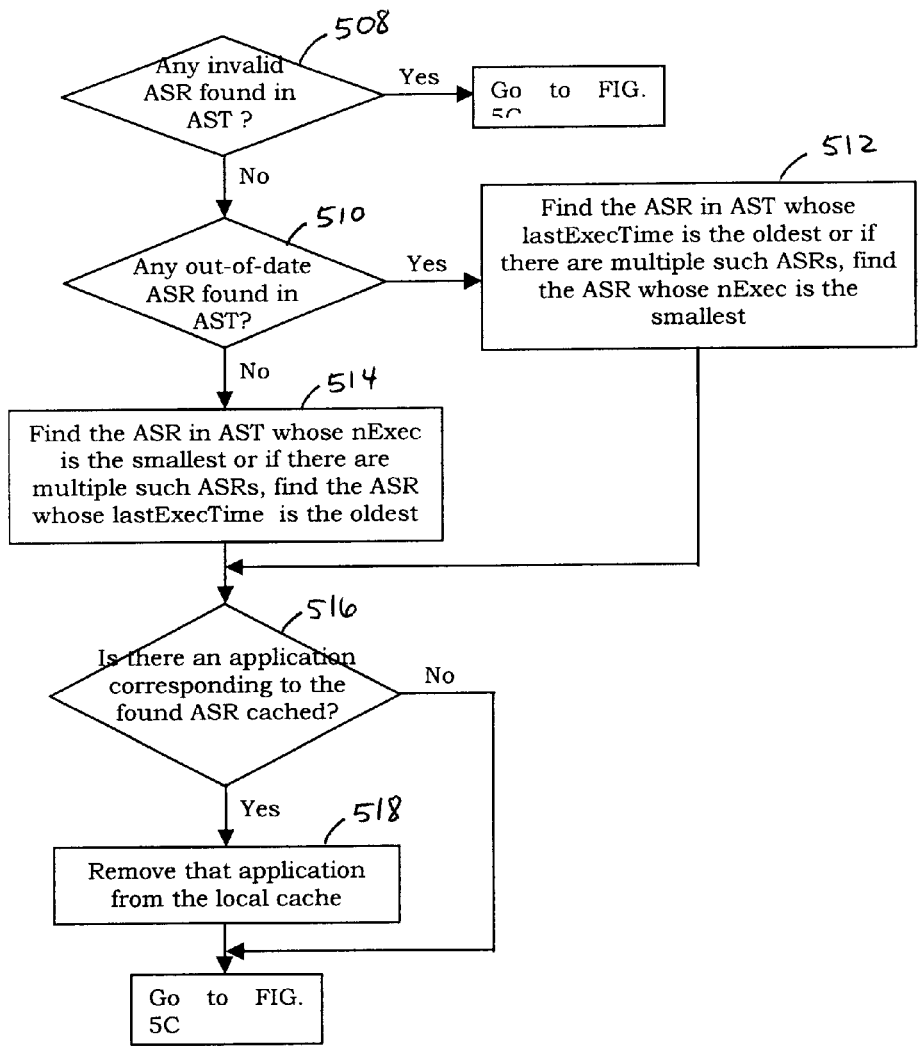
Figure 5C:
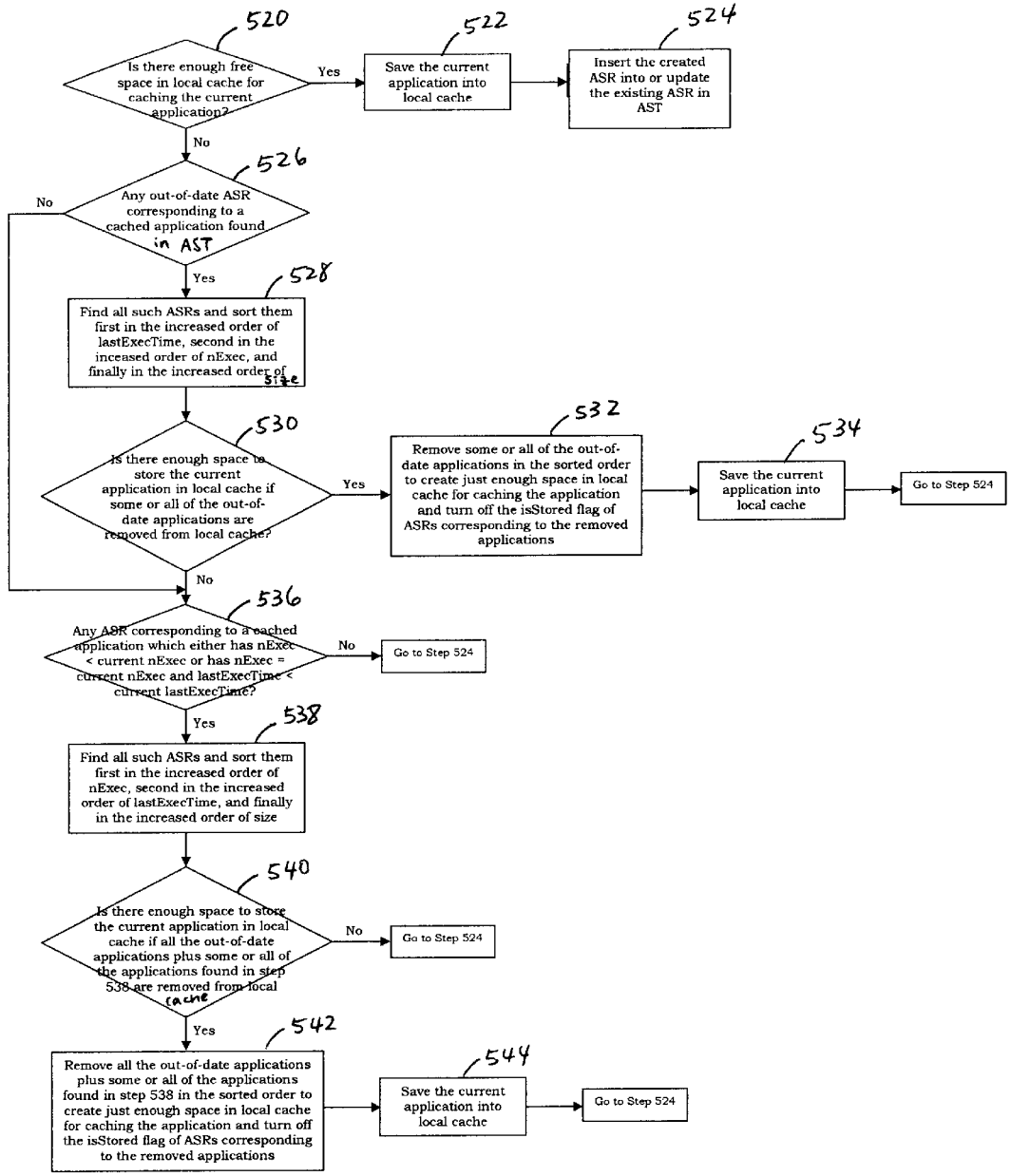

FIGS. 5A–5C illustrate an exemplary application management process in accordance with an embodiment of the invention. At step 502 of FIG. 5A, an application is downloaded to the mobile device 110. Whether a corresponding application selection record for the downloaded application already exists in the application selection table is determined (step 504). If not, a new application selection record for the downloaded application is created (step 506) and the process continues in FIG. 5B. If there already exists an application selection record for the downloaded application, the process continues in FIG. 5C.

In FIG. 5B, whether there is any invalid application selection record in the application selection table is determined (step 508). If so, the process continues in FIG 5C. If not, whether there is any out-of-date application selection record in the application selection table is determined (step 510). If so, the application selection record whose lastExecTime parameter is the oldest (least recent) is selected (step 512) and the process continues at step 516. If there are multiple application selection records having the same oldest lastExecTime, the record whose nExec parameter is the smallest is selected.

Referring back to step 510, if there is no out-of-date application selection records in the application selection table, the application selection record whose nExec parameter is the smallest is selected (step 514). If multiple application selecton records have the same smallest nExec value, the record whose lastExecTime parameter is the oldest is selected. At step 516, whether there is a cached application corresponding to the selected application selection record is determined. If so, that application is removed from the local cache (step 518) and the process continues in FIG. 5C. If there is no such cached application, the process continues in FIG. 5C.

In FIG. 5C, whether there is enough free space in the local cache for caching the current downloaded application is determined (step 520). If there is enough free space, the downloaded application is saved into the local cache (step 522) and a created or updated application selection record for the downloaded application is accordingly saved or updated in the application selection table (step 524). If there is not enough free space, whether there is any out-of-date application selection record corresponding to a cached application is determined (step 526). If not, the process continues at step 536. If so, all such application selection records are found and sorted in the increasing order of the lastExecTime parameter, the increasing order of the nExec parameter, then the increasing order of size (step 528). Next, whether there is enough space in the local cache if some or all of the out-of-date applications are removed from the local cache is determined (step 530). If so, some or all of the out-of-date applications in the sorted order are removed to create just enough space in the local cache for caching the downloaded application (step 532). In an exemplary embodiment, the isStore flags in the removed applications's corresponding application selection records are turned off (see FIG. 2B). Next, the downloaded application is stored into the local cache (step 534) and a created or updated application selection record for the downloaded application is accordingly saved or updated in the application selection table (step 524).

Referring back to step 530, if removal of some or all of the out-of-date applications is not going to create enough space, whether there is any application selection record corresponding to a cached application has its nExec parameter less than or equal to the nExec of the downloaded application and its lastExecTime less than the lastExecTime of the downloaded application is determined (step 536). If not, the downloaded application is not stored in the local cache and a created or updated application selection record for the downloaded application is saved or updated in the application selection table (step 524). Referring back to step 536, if any such application selection record exists, all of such application selection records are found and sorted in the increasing order of the nExec parameter, the increasing order of the lastExecTime, then the increasing order of size (step 538). Next, whether there is enough space to store the downloaded application in the local cache if all of the out-of-date applications plus some or all of the applications found and sorted in step 538 are removed is determined (step 540). If not, the downloaded application is not stored in the local cache and a created or updated application selection record for the downloaded application is saved or updated in the application selection table (step 524). Referring back to step 540, if there is going to be enough space, all of the out-of-date applications and some or all of the applications found and sorted in step 538 are removed to create just enough space for the downloaded application (step 542). The downloaded application is saved into the local cache (step 544) and a created or updated application selection record for the downloaded application is saved or updated in the application selection table (step 524).

Figure 6A:
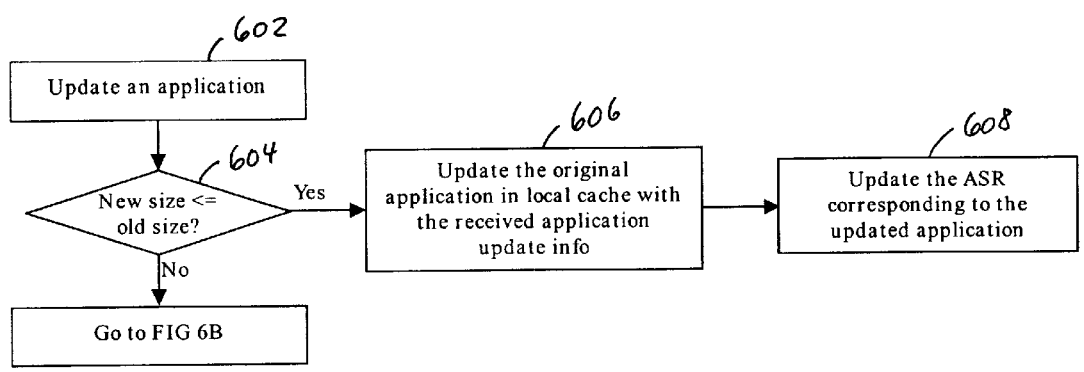
FIGS. 6A–B illustrate another exemplary application management process in accordance with embodiment of the invention.
Figure 6B:
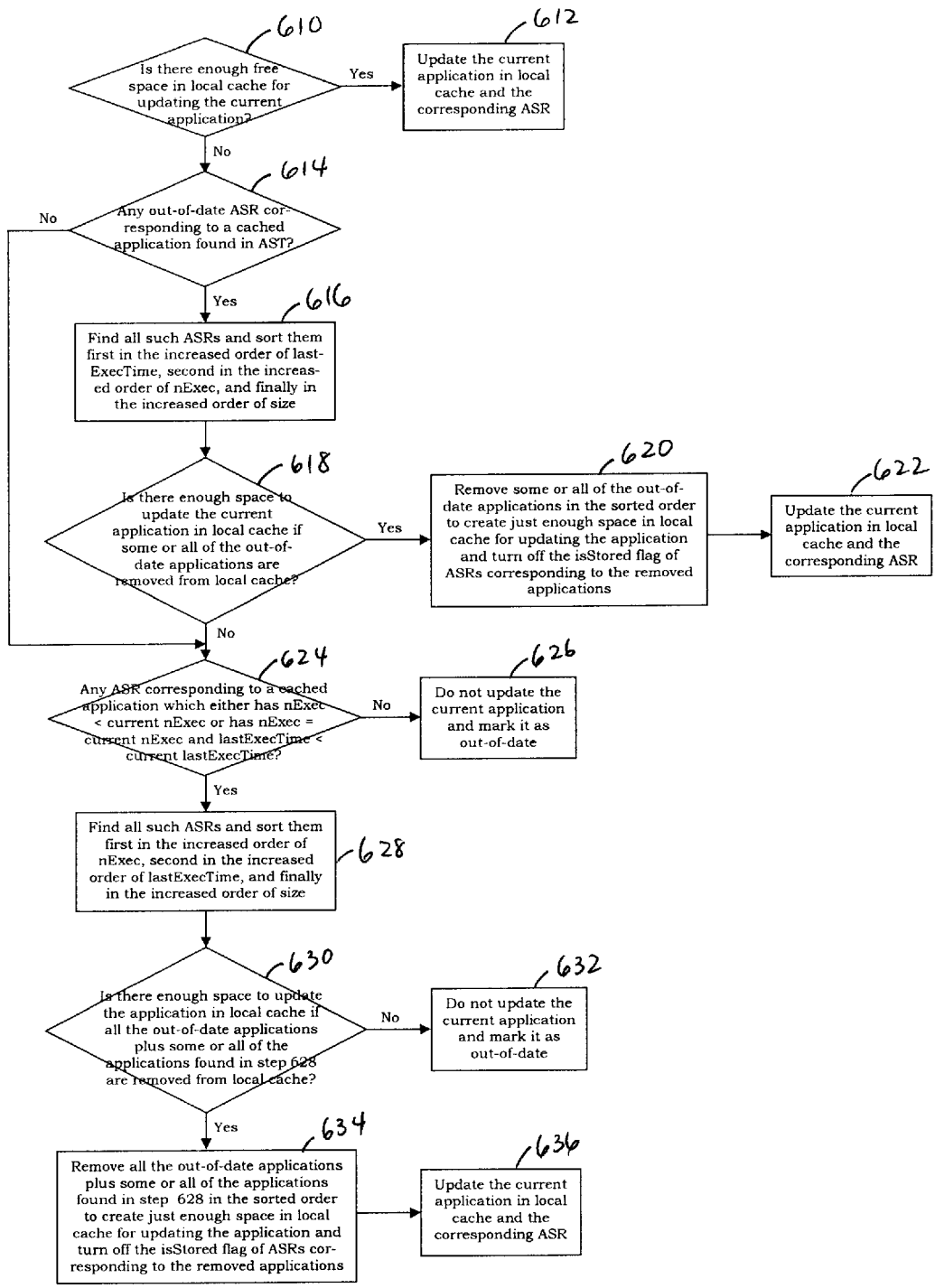

FIGS. 6A–B illustrate another exemplary application management process in accordance with an embodiment of the invention. At step 602, an update for an application is received. Next, whether the updated application size (new size) is less than or equal to the original application size (old size) is determined (step 604). If so, the original application in the local cache is updated (step 606). A corresponding application selection record is updated (step 608). Referring back to step 604, if the new size is greater than the old size, the process continues in FIG. 6B.

In FIG. 6B, whether there is enough space in the local cache for updating the application is determined (step 610). If so, the application is updated in the local cache and the corresponding application selection record is also updated (step 612). If not, whether there is any out-of date application selection record corresponding to a cached application is determined (step 614). If not, the process continues at step 624. If so, all such application selection records are found and sorted in the increasing order of the lastExecTime parameter, the increasing order of the nExec parameter, then the increasing order of size (step 616). Next, whether there is enough space to update the application if some or all of the out-of-date applications are removed from the local cache is determined (step 618). If so, some or all of the out-of-date applications are removed from the local cache in the sorted order to create just enough space in the local cache for updating the application (step 620). The isStored flags in the application selection records of the removed out-of-date applications are turned off. Next, the application is updated in the local cache and its corresponding application selection record is also updated (step 622).

Referring back to step 618, if there is not enough space even if all of the out-of-date applications are removed, whether there is any application selection record corresponding to a cached application that has its nExec parameter less than or equal to the current application's nExec parameter and its lastExecTime parameter less than the current application's lastExecTime parameter is determined (step 624). If not, the current application is not updated and is marked as out-of-date (step 626). If so, all such application selection records are found and sorted in the increasing order of the lastExecTime parameter, the increasing order of the nExec parameter, then the increasing order of size (step 628). Next, whether there is enough space to update the application in the local cache if all of the out-of-date applications plus some or all of the applications found and sorted in step 628 are removed is determined (step 630). If not, the application is not updated and is marked as out-of-date (step 632). Otherwise, all of the out-of-date applications plus some or all of the applications found in step 628 are removed in the sorted order to create just enough space in the local cache for updating the application (step 634). The isStored flags of the application selection records corresponding to the removed applications are turned off. Next, the application is updated in the local cache and its corresponding application selection record is also updated (step 636).

In an exemplary embodiment, once an application is stored in the local cache, its status is checked via one or more of the following methods: (1) initiated in response to a (multicast) notification from the original server; (2) automatically initiated by the mobile device 110 based on the nextReleaseTime parameter for the application; (3) automatically initiated by the mobile device 110 just before an execution of the application; (4) automatically initiated by the mobile device 110 after a failed function to communicate with a remote server or to read data; or (5) automatically initiated by the mobile device 110 while the mobile device 110 is idle.

In one embodiment, a multicast notification sent by an original server is received by all gateways 108. Typically, the notification includes a URL and an update application version ID for an application. In one embodiment, the update application version ID is dynamically generated based on the contents of the updated application. In another embodiment, the update application version ID is a message digest of the binary or text code of the application. For example, if message digest (e.g., MD4 or MD5) is used, the update application version ID should have a length of 16 bytes. Each gateway 108 that receives the notification determines a set of mobile devices 110 to pass the notification. In an exemplary embodiment, the set of mobile devices 110 is determined based on the latest uploads of user operation history that indicates the mobile device 110 that may still have a copy of the original application in its local cache. Once the set of mobile devices 110 is determined, the notification is sent to those mobile devices when the mobile device 110 is connected to the gateway 108.

Figure 7:
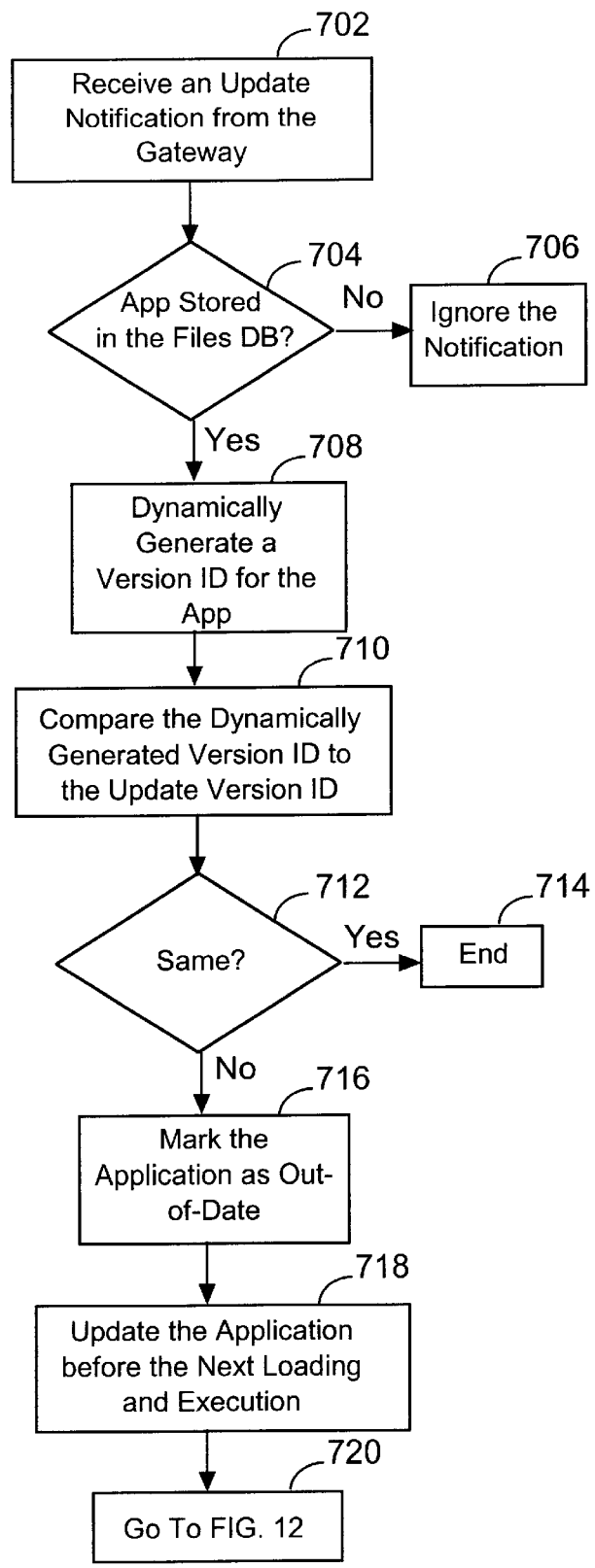
FIG. 7 illustrates another exemplary process in accordance with an embodiment of the invention.
Figure 12:
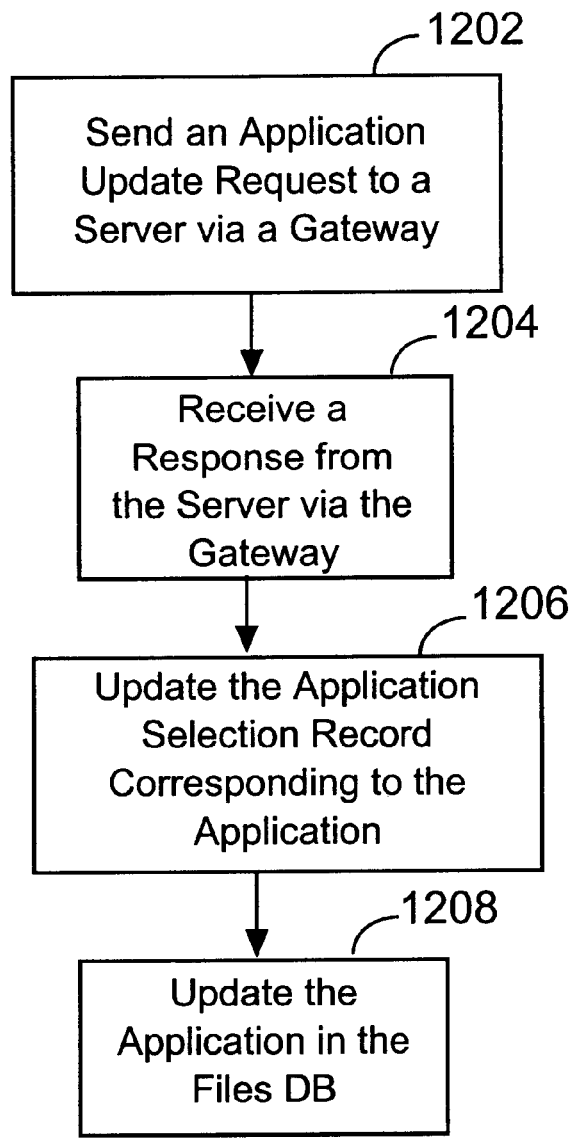
FIG. 12 illustrates another exemplary process in accordance with an embodiment of the invention.

FIG. 7 illustrates an exemplary process for a mobile device 110 to process a received notification in accordance with an embodiment of the invention. At step 702, the mobile device 110 receives an update notification from a gateway 108. Whether the original application to be updated is stored in the local cache is determined (step 704). If not, the update notification is ignored (step 706). If the original application is stored in the local cache (step 704), an original application version ID for the original application is dynamically generated (step 708). Next, the dynamically generated original application version ID is compared to the update application version ID provided in the notification (step 710). If the version IDs are the same (step 712), the process ends (step 714). Otherwise, the original application is marked "out-of-date" (step 716). The original application is automatically updated before the next loading or execution of the application (step 718). In an exemplary embodiment, only the differences between the updated version and the original version are updated. An exemplary process to automatically update an application is illustrated in FIG. 12 below.

Figure 8A:
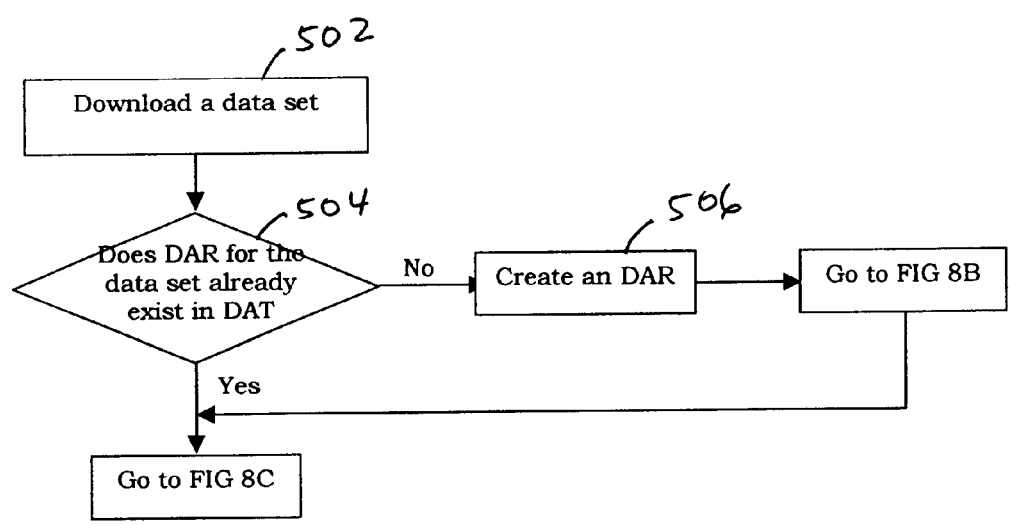
FIGS. 8A–8C illustrate an exemplary data management process in accordance with an embodiment of the invention.
Figure 8B:
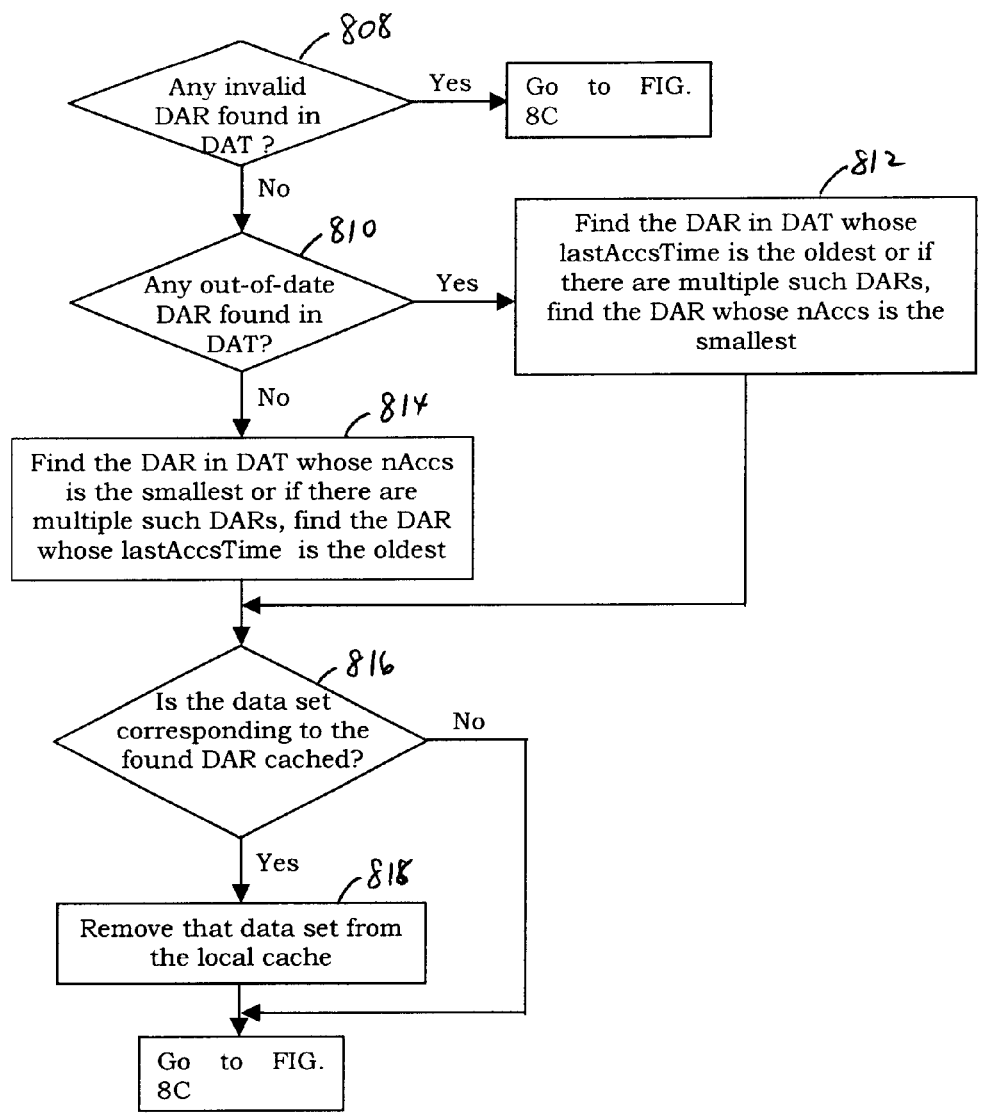
Figure 8C:
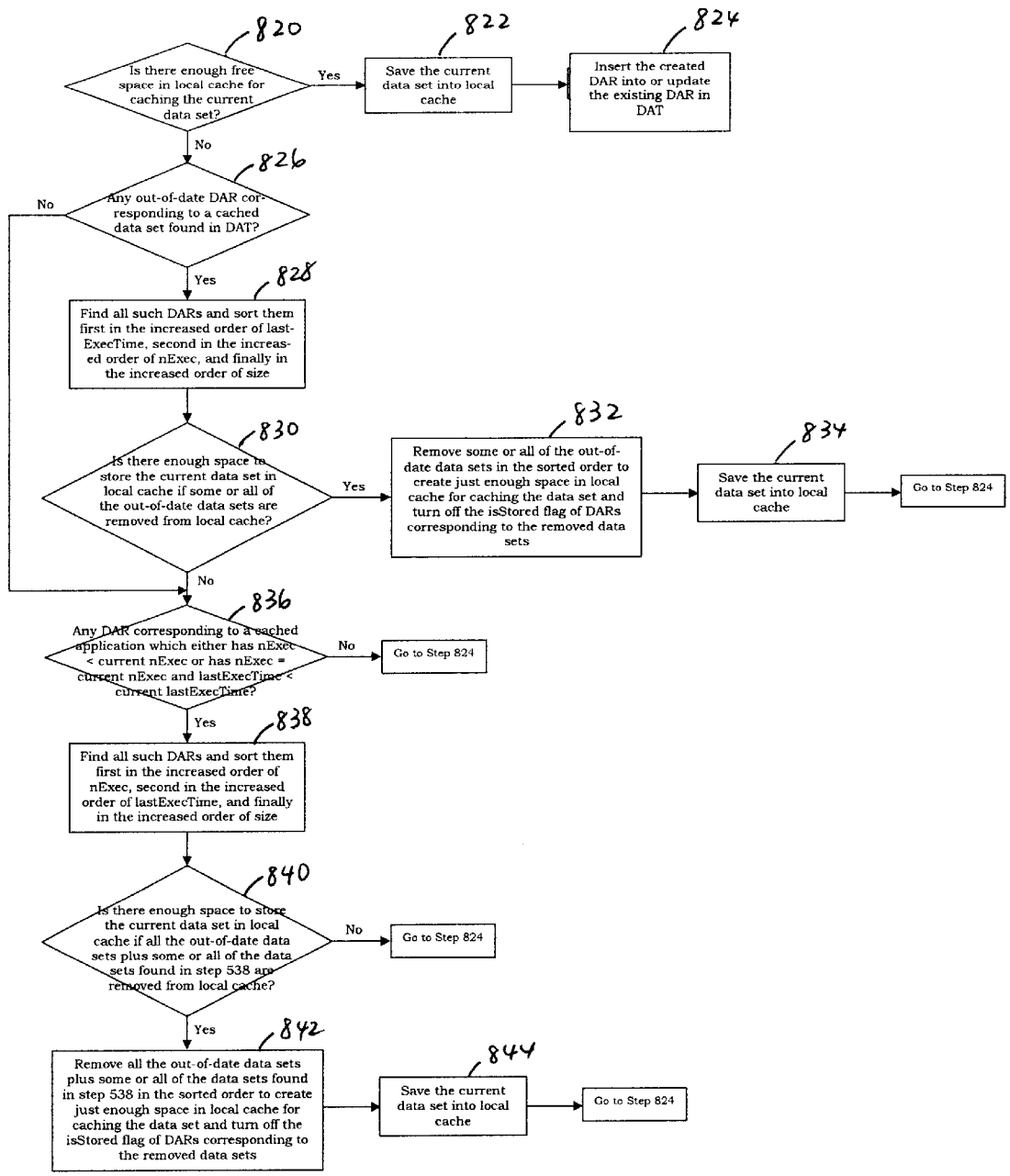

FIGS. 8A–8C illustrate an exemplary data set management process in accordance with an embodiment of the invention. At step 802 of FIG. 8A, a data set is downloaded to the mobile device 110. Whether a corresponding data access record for the downloaded data set already exists in the data access table is determined (step 804). If not, a new data access record for the downloaded data set is created (step 806) and the process continues in FIG. 8B. If there already exists an data access record for the downloaded data set, the process continues in FIG. 8C.

In FIG. 8B, whether there is any invalid data access record in the data access table is determined (step 808). If so, the process continues in FIG. 8C. If not, whether there is any out-of-date data access record in the data access table is determined (step 810). If so, the data access record whose lastAccsTime parameter is the oldest (least recent) is selected (step 812) and the process continues at step 816. If there are multiple data access records having the same oldest lastAccsTime, the record whose nAccs parameter is the smallest is selected.

Referring back to step 810, if there is no out-of-date data access records in the data access table, the data access record whose nAccs parameter is the smallest is selected (step 814). If multiple data access records have the same smallest nAccs value, the record whose lastAccsTime parameter is the oldest is selected. At step 816, whether there is a cached data set corresponding to the selected data access record is determined. If so, that data set is removed from the local cache (step 818) and the process continues in FIG. 8C. If there is no such cached data set, the process continues in FIG. 8C.

In FIG. 8C, whether there is enough free space in the local cache for caching the current downloaded data set is determined (step 820). If there is enough free space, the downloaded data set is saved into the local cache (step 822) and a created or updated data access record for the downloaded data set is accordingly saved or updated in the data access table (step 824). If there is not enough free space, whether there is any out-of-date data access record corresponding to a cached data set is determined (step 826). If not, the process continues at step 836. If so, all such data access records are found and sorted in the increasing order of the lastAccsTime parameter, the increasing order of the nAccs parameter, then the increasing order of size (step 828). Next, whether there is enough space in the local cache if some or all of the out-of-date data sets are removed from the local cache is determined (step 830). If so, some or all of the out-of-date data sets in the sorted order are removed to create just enough space in the local cache for caching the downloaded data set (step 832). In an exemplary embodiment, the isStore flags in the removed data sets's corresponding data access records are turned off (see FIG. 2C). Next, the downloaded data set is stored into the local cache (step 834) and a created or updated data access record for the downloaded data set is accordingly saved or updated in the data access table (step 824).

Referring back to step 830, if removal of some or all of the out-of-date data sets is not going to create enough space, whether there is any data access record corresponding to a cached data set has its nAccs parameter less than or equal to the nAccs of the downloaded data set and its lastAccsTime less than the lastAccsTime of the downloaded data set is determined (step 836). If not, the downloaded data set is not stored in the local cache and a created or updated data access record for the downloaded data set is saved or updated in the data access table (step 824). Referring back to step 836, if any such data access record exists, all of such data access records are found and sorted in the increasing order of the nAccs parameter, the increasing order of the lastAccsTime, then the increasing order of size (step 838). Next, whether there is enough space to store the downloaded data set in the local cache if all of the out-of-date data sets plus some or all of the data sets found and sorted in step 838 are removed is determined (step 840). If not, the downloaded data set is not stored in the local cache and a created or updated data access record for the downloaded data set is saved or updated in the data access table (step 824). Referring back to step 840, if there is going to be enough space, all of the out-of-date data sets and some or all of the data sets found and sorted in step 838 are removed to create just enough space for the downloaded data set (step 842). The downloaded data set is saved into the local cache (step 844) and a created or updated data access record for the downloaded data set is saved or updated in the data access table (step 824).

Figure 9A:
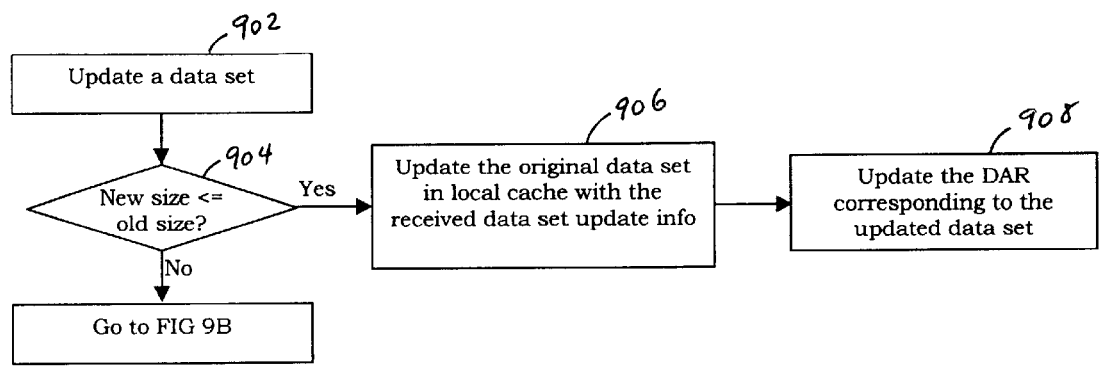
FIGS. 9A–B illustrate another exemplary data management process in accordance with an embodiment invention.
Figure 9B:
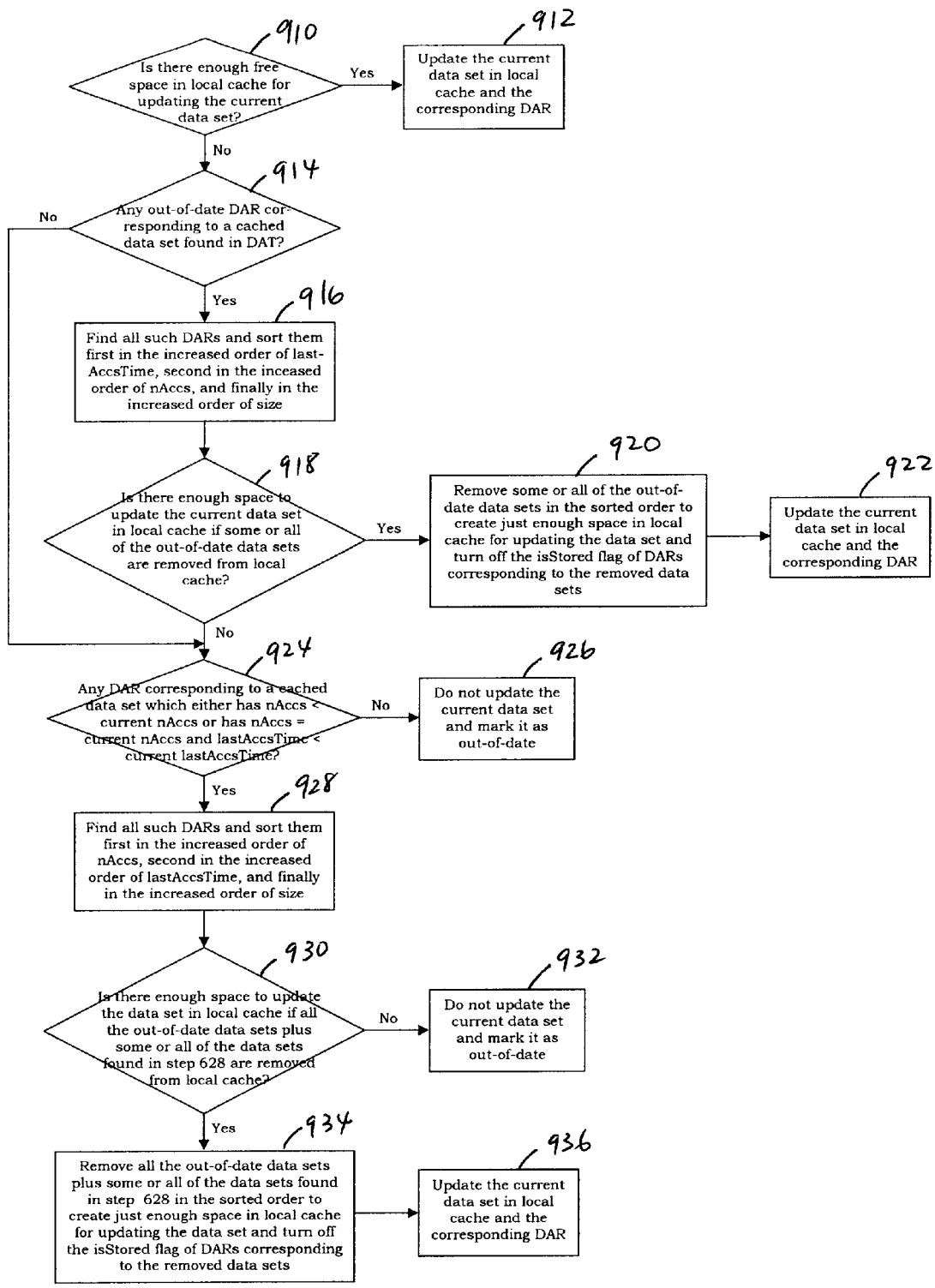

FIGS. 9A–B illustrate another exemplary data set management process in accordance with an embodiment of the invention. At step 902, an update for a data set is received. Next, whether the updated data set size (new size) is less than or equal to the original data set size (old size) is determined (step 904). If so, the original data set in the local cache is updated (step 906). A corresponding data access record is updated (step 908). Referring back to step 904, if the new size is greater than the old size, the process continues in FIG. 9B.

In FIG. 9B, whether there is enough space in the local cache for updating the data set is determined (step 910). If so, the data set is updated in the local cache and the corresponding data access record is also updated (step 912). If not, whether there is any out-of date data access record corresponding to a cached data set is determined (step 914). If not, the process continues at step 924. If so, all such data access records are found and sorted in the increasing order of the lastAccsTime parameter, the increasing order of the nAccs parameter, then the increasing order of size (step 916). Next, whether there is enough space to update the data set if some or all of the out-of-date data sets are removed from the local cache is determined (step 918). If so, some or all of the out-of-date data sets are removed from the local cache in the sorted order to create just enough space in the local cache for updating the data set (step 920). The isStored flags in the data access records of the removed out-of-date data sets are turned off. Next, the data set is updated in the local cache and its corresponding data access record is also updated (step 922).

Referring back to step 918, if there is not enough space even if all of the out-of-date data sets are removed, whether there is any data access record corresponding to a cached data set that has its nAccs parameter less than or equal to the current data set's nAccs parameter and its lastAccsTime parameter less than the current data set's lastAccsTime parameter is determined (step 924). If not, the current data set is not updated and is marked as out-of-date (step 926). If so, all such data access records are found and sorted in the increasing order of the lastAccsTime parameter, the increasing order of the nAccs parameter, then the increasing order of size (step 928). Next, whether there is enough space to update the data set in the local cache if all of the out-of-date data sets plus some or all of the data sets found and sorted in step 928 are removed is determined (step 930). If not, the data set is not updated and is marked as out-of-date (step 932). Otherwise, all of the out-of-date data sets plus some or all of the data sets found in step 928 are removed in the sorted order to create just enough space in the local cache for updating the data set (step 934). The isStored flags of the data access records corresponding to the removed data sets are turned off. Next, the data set is updated in the local cache and its corresponding data access record is also updated (step 936).

Typically, each mobile device 110 communicates to servers on the Internet through gateways 108. Thus, if frequently used applications or data sets are cached intelligently at one or more gateways 108, communication traffic and efficiency of the system 100 could be greatly improved. In an exemplary embodiment, each gateway 108 uploads user operation histories of all mobile devices 110 it services and caches a set of the most frequently used applications and data sets for each user at the gateway 108 for a predetermined period of time. Thus, when a mobile device 110 requests one of the most frequently used applications, the version cached on the gateway 108 can be provided to the mobile device 110 more quickly than to retrieve it from a server. In one embodiment, the applications and data sets cached on the gateway 108 are kept up-to-date automatically by the gateway 108, in response to a mobile device 110 request of the application, or in response to a server update notification.

In an exemplary embodiment, the mobile smart connectivity module 216 and the gateway smart connectivity module 318 coordinate with each other to facilitate communications between the mobile device 110 and the gateway 108. In one embodiment, the gateway smart connectivity module 318 includes an application layer protocol that has multiple sub-protocols, including, a data synchronization protocol and a user operation history upload protocol. The data synchronization protocol enables data synchronization among gateways 108. The user operation history protocol enables gateways 108 to upload user information. In addition, both mobile and gateway smart connectivity modules 216 and 318 includes an application/data-set management protocol and an update multicast protocol. The application/data-set management protocol includes application/data set download, application/data set status check, and application/data set update processes. These processes are illustrated in more detail in FIGS. 10–12, respectively. For ease of explanation, only application download, status check, and update processes are described in FIGS. 10–12. These processes can be similarly applied to download, check status, and update data sets.

Figure 10:
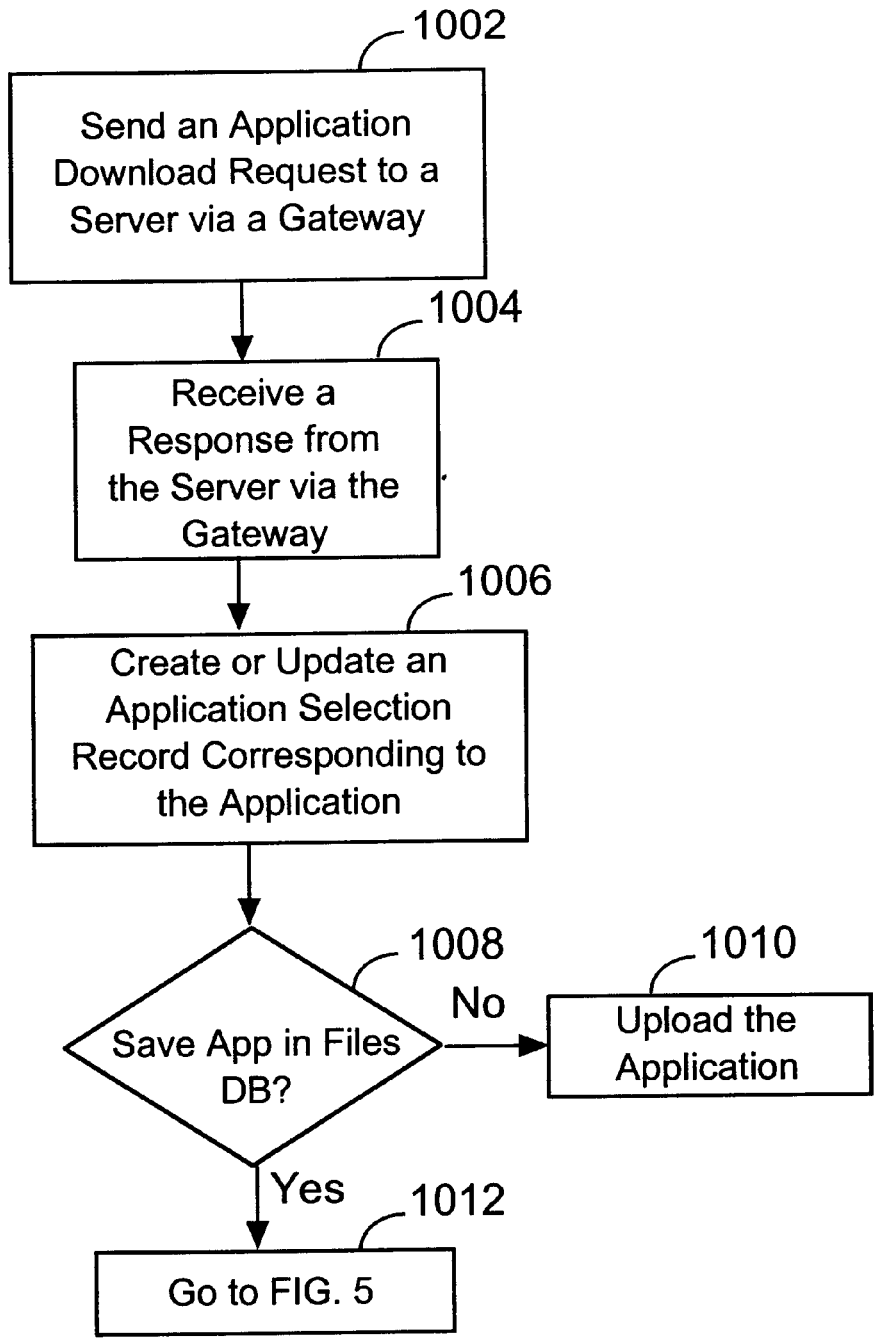
FIG. 10 illustrates another exemplary process in accordance with an embodiment of the invention.

FIG. 10 illustrates an exemplary application download process in accordance with an embodiment of the invention. At step 1002, an application download request is sent by a mobile device 110 to a server via a gateway 108. Next, the gateway 108 receives a response from the server and passes the response to the mobile device 110 (step 1004). In one embodiment, the response includes the requested application. Based on the response, the mobile device 110 creates or updates an application selection record corresponding to the requested application (step 1006). If the application should be saved in the files database 218 (e.g., it is a frequently used application by this user) (step 1010), then the process continues at FIG. 8A (step 1012). Otherwise, the application is uploaded and the process ends (step 1014).

Figure 11:
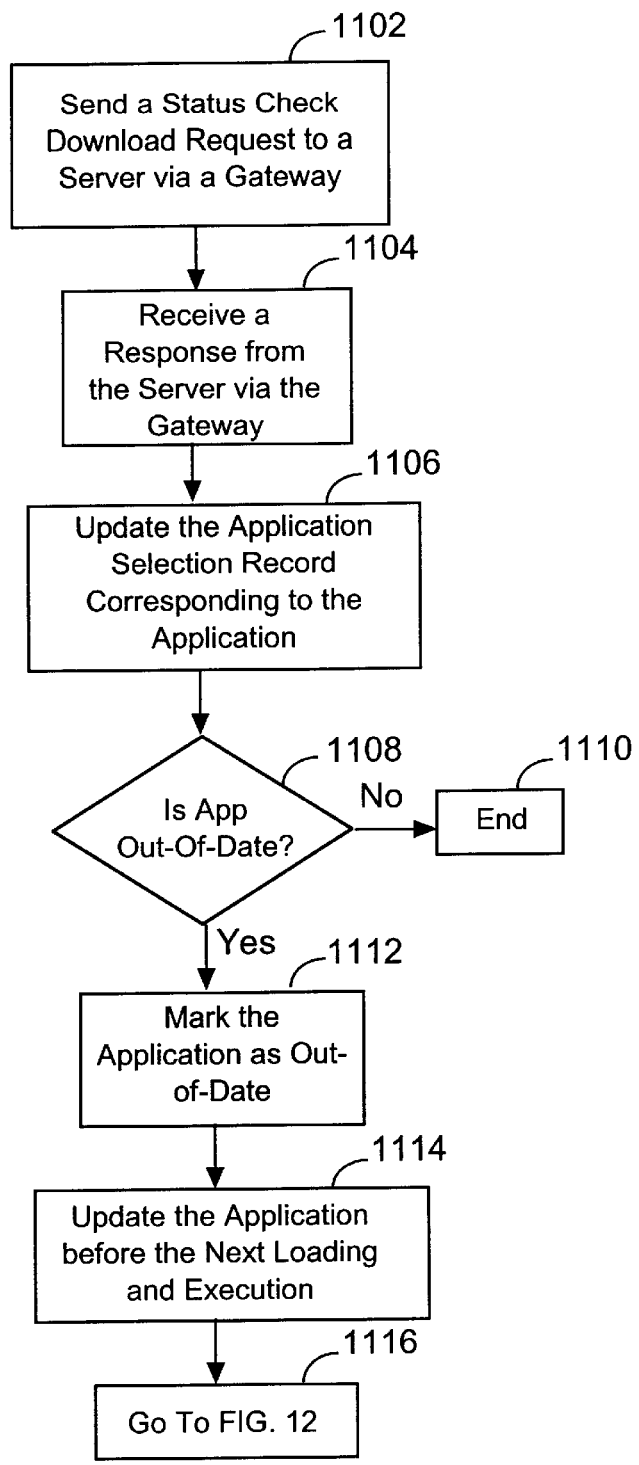
FIG. 11 illustrates another exemplary process in accordance with an embodiment of the invention.

FIG. 11 illustrates an exemplary application status check process in accordance with an embodiment of the invention. At step 1102, an application status check request is sent by a mobile device 110 to a server via a gateway 108 to check the status of an application. Next, the gateway 108 receives a response from the server and passes the response to the mobile device 110 (step 1104). At the mobile device 110, an application selection record corresponding to the application is updated (step 1106). Next, if the application is determined out-of-date based on the response (step 1108), the application is marked "out-of-date" (step 1112). Otherwise, the process ends (step 1110). If the application is marked out-of-date, the application is automatically updated before the next loading or execution of the application (step 1114).

An exemplary process to automatically update an application is illustrated in FIG. 12 below (step 1116).

FIG. 12 illustrates an exemplary application update process in accordance with an embodiment of the invention. At step 1202, an application update request is sent by a mobile device 110 to a server via a gateway 108 to update an application. In an exemplary embodiment, the application update request includes an application URL, a number of files that comprise the application, the name of the application, and a version IDs of each file of the application. A file version ID is a message digest of the binary or text code of the file and is dynamically generated based on the contents of the file. Next, the gateway 108 receives a response from the server and passes the response to the mobile device 110 (step 1204). In an exemplary embodiment, the response includes the application URL, the number of files added, modified, or deleted in the new version, the application name, content of each added or modified file, content length of each added, modified, or deleted file, and a next release schedule. At the mobile device, the application selection record corresponding to the application is updated (step 1206). Next, the application stored in the files database 218 is updated (step 1208). In an exemplary embodiment, the application is updated differentially. That is, only the added, modified, or deleted files are updated.

In an exemplary embodiment, the update multicast protocol enables application/data servers to notify mobile devices about changes to any downloaded applications or data sets from the servers. In particular, the update mulitcast protocol allows gateways 108 to receive update notifications from servers then relay the notifications to a sub-set of the mobile devices 110 each gateway 108 services. For example, when a gateway 108 receives an update notification, it determines a subset of mobile devices (among all the mobile devices it services) that is likely to contain a cached copy of the application/data set to be updated. In an exemplary embodiment, the gateway 108 makes the determination based on user operation history uploaded from each mobile device 110. After such determination, the gateway 108 then only send the update notification to those mobile devices 110. In one embodiment, the update notification sent by a gateway 108 to a mobile device 110 includes the application/data set URL and an update application version ID or a summarized ObjectStore version. After receiving an update notification from a gateway 108, the mobile device determines if it has a copy of the application or data set in its files database 218. If so, the mobile device 110 compares the differences between the saved copy and the new version and marks any differences in the application or data set as out-of-date. Such out-of-date applications and data sets are later updated before the next execution or access to those applications and data sets.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for managing information in a mobile device, comprising the steps of:
   downloading a first set of files;
   determining whether a local cache has enough space to store said set of files:
   if enough space, storing said set of files into said local cache;
   if not enough space, selecting a record based on frequency of access to said record and removing a second set of files corresponding to said record from said local cache; and
   repeating said determining step until said first set of files is stored into said local cache.

2. The method of claim 1, wherein said selecting step includes the step of:
   selecting an application selection record associated to a least recently executed application or a least frequently executed application based on parameter values in each application selection record.

3. The method of claim 1, wherein said selecting step includes the step of:
   selecting a data access record associated to a least recently accessed data set or a least frequently accessed data set based on parameter values in each data access record.

4. The method of claim 1, further comprising the steps of:
   creating a record corresponding to the first set of files; and
   storing said record into a database regardless of whether said first set of files is stored into said local cache.

5. A method for managing information in a mobile device, comprising the steps of:
   receiving a set of update files;
   update a set of original files in a local cache with said set of update files if said set of update files is smaller than or equal to the size of said set of original files;
   determining whether said local cache has enough space to store said set of update files if said set of update files is larger than the size of said set of original files:
   if enough space, updating said set of original files in said local cache in accordance with said set of update files;
   if not enough space, selecting a record based on a frequency of access to said record and removing a set of files corresponding to said record from said local cache; and
   repeating said determining step until said set of original files is updated in said local cache.

6. The method of claim 4, wherein said set of update files is a set of update application files or a set of update data set files.

7. A method for managing information in a mobile device, comprising the steps of:
   receiving an update notification to update a set of files stored in a local cache, said update notification including an update version identification;
   dynamically generating an original version identification for said set of files;
   comparing said update version identification to said original version identification;
   marking said set of files as out-dated if said update version identification is different than said original version identification; and
   automatically updating said set of files prior to processing a loading or execution command.

8. The method of claim 7, wherein said set of files is a set of application files or a set of data set files.

9. A computer program product for managing information in a mobile device, comprising:
   logic code for downloading a first set of files;
   logic code for determining whether a local cache has enough space to store said set of files:
   if enough space, logic code for storing said set of files into said local cache;

if not enough space, logic code for selecting a record based on a frequency of access to said record and removing a second set of files corresponding to said record from said local cache; and logic code for repeating said determining until said first set of files is stored into said local cache.

10. The computer program product of claim 9, wherein said logic code for selecting includes:

logic code for selecting an application selection record associated to a least recently executed application or a least frequently executed application based on parameter values in each application selection record.

11. The computer program product of claim 9, wherein said logic code for selecting includes:

logic code for selecting a data access record associated to a least recently accessed data set or a least frequently accessed data set based on parameter values in each data access record.

12. The computer program product of claim 9, further comprising:

logic code for creating a record corresponding to the first set of files; and logic code for storing said record into a database regardless of whether said first set of files is stored into said local cache.

13. A computer program product for managing information in a mobile device, comprising:

logic code for receiving a set of update files;

logic code for updating a set of original files in a local cache with said set of update files if said set of update files is smaller than or equal to the size of said set of original files;

logic code for determining whether said local cache has enough space to store said set of update files if said set of update files is larger than the size of said set of original files:

if enough space, logic code for updating said set of original files in said local cache in accordance with said set of update files;

if not enough space, logic code for selecting a record based on a frequency of access of said record and removing a set of files corresponding to said record from said local cache; and logic code for repeating said determining until said set of original files is updated in said local cache.

14. The computer program product of claim 13, wherein said set of update files is a set of update application files or a set of update data set files.

15. A computer program product for managing information in a mobile device, comprising:

logic code for receiving an update notification to update a set of files stored in a local cache, said update notification including an update version identification;

logic code for dynamically generating an original version identification for said set of files;

logic code for comparing said update version identification to said original version identification;

logic code for marking said set of files as out-dated if said update version identification is different than said original version identification; and logic code for automatically updating said set of files prior to processing a loading or execution command.

16. The computer program product of claim 15, wherein said set of files is a set of application files or a set of data set files.

* * * * *